US006099717A

United States Patent [19]

Yamada et al.

[11] Patent Number: 6,099,717

[45] Date of Patent: Aug. 8, 2000

[54] METHOD OF AND APPARATUS FOR DETECTING A DETERIORATED CONDITION OF A WIDE RANGE AIR-FUEL RATIO SENSOR

[75] Inventors: Tessho Yamada, Nagoya; Takeshi Kawai, Aichi; Yuji Oi, Nagoya; Shigeki Mori, Gifu; Satoshi Teramoto, Aichi; Toshiya Matsuoka, Gifu, all of Japan

[73] Assignee: NGK Spark Plug Co., Ltd., Nagoya, Japan

[21] Appl. No.: 08/965,420

[22] Filed: Nov. 6, 1997

[30] Foreign Application Priority Data

Nov. 6, 1996 [JP] Japan .................................... 8-310102

[51] Int. Cl.[7] .................................................. G01N 27/407

[52] U.S. Cl. ....................... 205/784.5; 204/401; 204/425; 204/426; 204/427

[58] Field of Search ..................................... 204/401, 402, 204/421–429; 205/785, 783.5, 784, 784.5

[56] References Cited

U.S. PATENT DOCUMENTS

| | | | |
|---|---|---|---|
| 4,167,163 | 9/1979 | Moder | 204/401 |
| 4,419,190 | 12/1983 | Dietz et al. | 204/425 |
| 4,543,176 | 9/1985 | Harada et al. | 204/406 |
| 4,626,338 | 12/1986 | Kondo et al. | 204/429 |
| 4,938,194 | 7/1990 | Kato et al. | 123/479 |
| 5,172,677 | 12/1992 | Suzuki | 123/688 |
| 5,174,885 | 12/1992 | Hayakawa et al. | 204/425 |
| 5,194,135 | 3/1993 | Hayakawa et al. | 204/425 |
| 5,340,462 | 8/1994 | Suzuki | 204/425 |
| 5,700,367 | 12/1997 | Yamada et al. | 204/425 |

FOREIGN PATENT DOCUMENTS

| | | | |
|---|---|---|---|
| 0507149A1 | 10/1992 | European Pat. Off. . |
| 19612387 | 10/1996 | Germany . |
| 62-177442 | 8/1987 | Japan . |

OTHER PUBLICATIONS

Translation of JP 62–177442, Aug. 1987, pp. 1–9.

*Primary Examiner*—T. Tung
*Attorney, Agent, or Firm*—Foley & Lardner

[57] ABSTRACT

A method of detecting a deteriorated condition of a wide range air-fuel ratio sensor is provided. Firstly, a current is applied to an electromotive force cell to detect a voltage Vs0 across electrodes on opposite side surfaces of the cell. Application of the current is suspended, and a voltage drop Vsd1 across the electrodes is detected after lapse of a time ranging from 10 μs to 1 ms after the application of the current is suspended. Based on the voltage drop Vsd1 is detected a first resistance value Rvs1 equated to the temperature of the electromotive force cell. Further, after lapse of a time ranging from 10 ms to 50 ms after the application of the current to the electromotive force cell is suspended, a voltage drop Vsd2 across the electrodes of the electromotive force cell is detected. Based on the voltage drop Vsd2 is detected a second resistance value Rvs2 equated to an internal resistance of the electromotive force cell including a resistance component resulting from deterioration. By comparison of the resistance values Rvs1 and Rvs2, the deteriorated condition of the wide range air-fuel ratio is detected. An apparatus for carrying out such a method is also provided.

3 Claims, 9 Drawing Sheets

METHOD OF AND APPARATUS FOR DETECTING A DETERIORATED CONDITION OF A WIDE RANGE AIR-FUEL RATIO SENSOR

BACKGROUND OF THE INVENTION

1. Field of the Invention

The present invention relates to a method of detecting a deteriorated condition of a wide range air-fuel ratio sensor, i.e., whether a wide range air-fuel ratio has been deteriorated or not. The present invention further relates to an apparatus for carrying out such a method.

2. Description of the Related Art

For controlling an air-fuel ratio mixture to be supplied to an engine in a way as to allow the air-fuel ratio to be maintained at a target value (i.e., stoichiometric) and thereby reducing the concentration of CO, NOx, and HC in the engine exhaust gases, it is known to carry out a feedback control of a quality of fuel to be supplied to the engine. Mainly used for such feedback control is a λ (lambda) sensor whose output changes abruptly or sharply (i.e., stepwise) in response to a particular oxygen concentration, i.e., a theoretical air-fuel ratio mixture, and further is a wide range air-fuel ratio sensor or oxygen sensor, whose output changes smoothly and continuously (i.e., not stepwise) in response to a variation of the air-fuel ratio from a lean mixture mode or range to a rich mixture mode or range. The wide range air-fuel ratio sensor, as mentioned above, is capable of detecting the oxygen concentration in an engine exhaust gas continuously and improving the feedback control accuracy and speed, and is thus used in case the higher-speed and more accurate feedback control is required.

The wide range air-fuel ratio sensor is provided with two cells which are made of oxygen ion conductive solid electrolytic bodies and disposed so as to oppose each other with a certain interval or gap (measurement chamber) therebetween. One of the cells is used as a pump cell for pumping out the oxygen from or into the gap between the cells. The other of the cells is used as an electromotive force cell for generating a voltage depending upon a difference in the oxygen concentration between an oxygen reference chamber and the above gap. The pump cell is operated in such a manner that the output of the electromotive force cell is constant, and the current supplied to the pump cell to this end is measured for use as a value proportional to a measured oxygen concentration. An example of such a wide range air-fuel ratio sensor is disclosed in U.S. Pat. Nos. 5,174,885 and 5,194,135.

The above described feedback control for reducing the noxious components contained in the exhaust gases starts after the engine has warmed up. This is because the wide range air-fuel ratio sensor is not active or operable until it is heated up to a predetermined temperature to make higher the activity of its oxygen ion conductive solid electrolyte. For this reason, a heater is provided to the wide range air-fuel ratio sensor in order to make it operable as soon as possible after starting of the engine.

In this connection, before starting of the feedback control by the above described wide range air-fuel ratio sensor, the air-fuel ratio is, in many cases, regulated to a rich mode with a view to preventing stopping of the engine such that the exhaust gases with a relatively high concentration of CO and HC are emitted. In order that the wide range air-fuel ratio sensor can be put into action as early as possible after starting of the engine so that the emission of such exhaust gases with a high concentration of noxious components is terminated within a short time, judgment on whether the wide range air-fuel ratio sensor has been activated or not is made by applying a predetermined current to the electromotive force cell for measurement of the resistance.

The electromotive force cell has a negative temperature-resistance characteristic, so its resistance becomes gradually smaller as it is heated up to a higher temperature by a heater. Namely, from the fact that the electromotive force cell has been reached a temperature at which it becomes active or operable, it is judged that the wide range air-fuel ratio sensor is in condition of being capable of starting measurement.

In this connection, deterioration is not caused in the oxygen ion conductive electrolytic body constituting the electromotive force cell of the wide range air-fuel ratio sensor but in the porous electrode made of Pt (platinum) or the like and attached to the electromotive force cell and in the interface between the solid electrolytic body and the porous electrode. Namely, the porous electrode is separated from the oxygen ion conductive solid electrolytic body or reduces in the oxygen permeability after a certain period of usage of the sensor, thus increasing in the internal resistance and deteriorating gradually.

When the deterioration has advanced above a certain degree, here arises a problem that it becomes impossible to carry out accurate detection of the air-fuel ratio. Up to now, there has not been known a method that can detect deterioration of such a wide range air-fuel ratio sensor accurately.

SUMMARY OF THE INVENTION

According to a first aspect of the present invention, there is provided a method of detecting a deteriorated condition of a wide range air-fuel ratio sensor, wherein the air-fuel ratio sensor includes two cells each having an oxygen ion conductive solid electrolytic body heated by a heater and two porous electrodes disposed on opposite sides of the oxygen ion conductive solid electrolytic body, respectively, the two cells are disposed so as to oppose each other with a gap therebetween, one of the cells is used as a pump cell for pumping oxygen out of or into the gap, and the other of the cells is used as an electromotive force cell for generating a voltage according to a difference in oxygen concentration between an oxygen reference chamber and the gap, the method comprising a first step of applying a current to the electromotive force cell, a second step of detecting a voltage $Vs\mathbf{0}$ across the electrodes on opposite side surfaces of the electromotive force cell, a third step of suspending the aforementioned applying of the current to the electromotive force cell, a fourth step of detecting a voltage $Vs\mathbf{1}$ across the electrodes on the opposite side surfaces of the electromotive force cell after lapse of a time ranging from 10 μs to 1 ms after the aforementioned third step, a fifth step of detecting a voltage $Vs\mathbf{2}$ across the electrodes on the opposite side surfaces of the electromotive force cell after lapse of a time ranging from 10 ms to 50 ms after the aforementioned third step, and a sixth step of detecting the deteriorated condition of the wide range air-fuel ratio sensor based on the voltages $Vs\mathbf{0}$, $Vs\mathbf{1}$ and $Vs\mathbf{2}$.

By the first aspect, a current is applied to the electromotive force cell, and the voltage $Vs\mathbf{0}$ across the electrodes on the opposite side surface of the electromotive force cell is detected. Thereafter, the application of the current to the electromotive force cell is suspended, and after lapse of the time ranging from 10 μm to 1 ms after the aforementioned suspending is detected the voltage $Vs\mathbf{1}$ across the electrodes on the opposite side surfaces of the electromotive force cell. From the voltage $Vs\mathbf{1}$ is known the resistance value (i.e., temperature) of the electromotive force cell. Then, after lapse of the time ranging from 10 ms to 50 ms after the aforementioned application of the current is suspended is detected the voltage Vs2 across the electrodes of the electromotive force cell. From this voltage Vs2 is known the deteriorated condition of the electromotive force cell. However, the voltage Vs2 is affected by the temperature of the electromotive force cell, i.e., the voltage Vs2 is variable depending upon a variation of the temperature of the electromotive force cell. For this reason, the deteriorated condition of the electromotive force cell is detected based on the voltages Vs0, Vs1 and Vs2.

According to a second aspect of the present invention, there is provided the method according to the first aspect, wherein the third step is executed after lapse of a predetermined time from the start of energizing the heater.

By the second aspect, the application of the current to the electromotive force cell is suspended after lapse of a predetermined time after it starts to energize the heater. Namely, it is continued to supply a current or apply a voltage to the electromotive force cell without any suspension thereof until there is caused a possibility that the electromotive force cell has been activated.

According to the third aspect, there is provided the method according to claim 1, wherein the third step starts after the voltage Vs0 detected at the second step becomes equal to or lower than a predetermined value.

By the third aspect, the suspending of the application of the current starts after the detected voltage Vs0 becomes equal to or lower than a predetermined value. Namely, it is continued to supply a current or apply a voltage to the electromotive force cell without any suspension thereof until there is caused a possibility that the electromotive force cell has been activated.

According to a fourth aspect of the present invention, there is provided a method of detecting a deteriorated condition of a wide range air-fuel ratio sensor, wherein the air-fuel ratio sensor includes two cells each having an oxygen ion conductive solid electrolytic body heated by a heater and two porous electrodes disposed on opposite sides of the oxygen ion conductive solid electrolytic body, respectively, the two cells are disposed so as to oppose each other with a gap therebetween, one of the cells is used as a pump cell for pumping oxygen out of or into the gap, and the other of the cells is used as an electromotive force cell for generating a voltage according to a difference in oxygen concentration between an oxygen reference chamber and the gap, the method comprising a first step of applying a current to the electromotive force cell, a second step of detecting a voltage Vs0 across the electrodes on opposite side surfaces of the electromotive force cell, a third step of suspending the aforementioned applying of the current to the electromotive force cell, a fourth step of detecting a voltage Vs1 across the electrodes on the opposite side surfaces of the electromotive force cell after lapse of a time ranging from 10 $\mu$s to 1 ms after the aforementioned third step, a fifth step of detecting a voltage Vs2 across the electrodes on the opposite side surfaces of the electromotive force cell after lapse of a time ranging from 10 ms to 50 ms after the aforementioned third step, a sixth step of detecting a first resistance value Rvs1 of the electromotive force cell based on the voltages Vs0 and Vs1, a seventh step of detecting a second resistance value Rvs2 of the electromotive force cell based on the aforementioned voltages Vs0 and Vs2, and an eighth step of detecting the deteriorated condition of the wide range air-fuel ratio sensor by comparison of the aforementioned resistance values Rvs1 and Rvs2.

By the fourth aspect, a current is applied to the electromotive force cell, and the voltage Vs0 across the electrodes on the opposite side surfaces of the electromotive force cell is detected. Thereafter, the application of the current to the electromotive force cell is suspended, and after the lapse of the time ranging from 10 $\mu$m to 1 ms after the aforementioned suspension is detected the voltage Vs1 across the electrodes on the opposite side surfaces of the electromotive force cell. Further, after the lapse of the time ranging from 10 ms to 50 ms is detected the voltage Vs2 across the electrodes on the opposite side surfaces of the electromotive force cell. Based on the voltages Vs0 and Vs1 is detected the first resistance value Rvs1 which is equated to the temperature of the electromotive force cell, and based on the voltages Vs0 and Vs2 is detected the second resistance value Rvs2 which is equated to the internal resistance of the electromotive force cell including a component resulting from deterioration. The resistance value Rvs2 is affected by the temperature of the electromotive force cell, i.e., the resistance value Rvs2 is variable depending upon a variation of the temperature of the electromotive force cell. For this reason, the deteriorated condition of the electromotive force cell is detected by comparison between the resistance Value Rvs1 and the resistance value Rvs2.

According to a fifth aspect of the present invention, there is provided a method of detecting a deteriorated condition of a wide range air-fuel ratio sensor, wherein the air-fuel ratio sensor includes two cells each having an oxygen ion conductive solid electrolytic body heated by a heater and two porous electrodes disposed on opposite sides of the oxygen ion conductive solid electrolytic body, respectively, the two cells are disposed so as to oppose each other with a gap therebetween, one of the cells is used as a pump cell for pumping oxygen out of or into the gap, and the other of the cells is used as an electromotive force cell for generating a voltage according to a difference in oxygen concentration between an oxygen reference chamber and the gap, the method comprising a first step of applying a current to the electromotive force cell, a second step of detecting a voltage Vs0 across the electrodes on opposite side surfaces of the electromotive force cell, a third step of suspending the applying of the current to the electromotive force cell, a fourth step of detecting a voltage Vs2 across the electrodes on the opposite side surfaces of the electromotive force cell after lapse of a time ranging from 10 ms to 50 ms after the third step, a fifth step of detecting the activated condition of the wide range air-fuel ratio sensor based on the voltages Vs0 and Vs2, a sixth step of detecting a time interval Ts between the time when it starts to energize the heater and the time when it is detected in the fifth step that the wide range air-fuel ratio sensor is in an activated condition, and a seventh step of detecting the deteriorated condition of the wide range air-fuel ratio sensor based on the time interval Ts detected at the sixth step.

By the fifth step, a current is applied to an electromotive force cell, and a voltage Vs0 across electrodes on the opposite side surface of the electromotive force cell is detected. Then, the application of the current to the electromotive force cell is suspended, and after lapse of a time ranging from 10 ms to 50 ms after the aforementioned suspension is detected a voltage Vs2 across the electrodes on the opposite side surfaces of the electromotive force cell. Based on the voltages Vs0 and Vs2 is detected the activated condition of the wide range air-fuel ratio sensor. It is measured a time interval between the time when it starts to energize the heater and the time when it is detected that the wide range air-fuel ratio sensor has been activated. In this connection, when the wide range air-fuel ratio sensor has been deteriorated, it becomes higher the temperature at which the sensor becomes active. For this reason, the deteriorated condition of the wide range air-fuel ratio sensor is detected based on the time interval Ts necessary for the sensor to be activated.

According to a sixth aspect of the present invention, there is provided an apparatus for detecting an activated condition of a wide range air-fuel ratio sensor, the air-fuel ratio sensor including two cells each having an oxygen ion conductive solid electrolytic body heated by a heater and two porous electrodes disposed on opposite sides of the oxygen ion conductive solid electrolytic body, respectively, the two cells being disposed so as to oppose each other with a gap therebetween, one of the cells being used as a pump cell for pumping oxygen out of or into the gap, the other of the cells being used as an electromotive force cell for generating a voltage according to a difference in oxygen concentration between an oxygen reference chamber and the gap, the apparatus comprising current applying means for applying a current to the electromotive force cell, voltage Vs0 detecting means for detecting a voltage Vs0 across the electrodes on opposite side surfaces of the electromotive force cell, suspending means for suspending the applying of the current to the electromotive force cell, voltage Vs1 detecting means for detecting a voltage Vs1 across the electrodes on the opposite side surfaces of the electromotive force cell after lapse of a time ranging from 10 μs to 1 ms after the applying of the current to the electromotive force cell is suspended, Vs2 voltage detecting means for detecting a voltage Vs2 across the electrodes on the opposite side surfaces of the electromotive force cell after lapse of a time ranging from 10 ms to 50 ms after the applying of the current to the electromotive force cell is suspended, Rvs1 detecting means for detecting a first resistance value Rvs1 of the electromotive force cell based on the voltages Vs0 and Vs1, Rvs2 detecting means for detecting a second resistance value Rvs2 of the electromotive force cell based on the voltages Vs0 and Vs2, and deterioration detecting means for detecting the deteriorated condition of the wide range air-fuel ratio sensor based on the resistance values Rvs1 and Rvs2.

By the sixth aspect, the current applying means applies a current to the electromotive force cell, and the voltage Vs0 detecting means detects the voltage Vs0 across the electrodes on the opposite side surfaces of the electromotive force cell. The suspending means suspends the application of the current to the electromotive force cell after lapse of a predetermined time after it starts to energize the heater. The voltage Vs1 detecting means detects the voltage Vs1 across the electrodes on the opposite side surfaces of the electromotive force cell after lapse of a time ranging from 10 μs to 1 ms after the current is suspended. Further, the voltage Vs2 detecting means detects the voltage Vs2 across the electrodes on the opposite side surfaces of the electromotive force cell after lapse of a time ranging from 10 ms to 50 ms after the application of the current is suspended. The Rvs1 detecting means detects the first resistance value Rvs1 equated to the temperature of the electromotive force cell, and the Rvs2 detecting means detects the second resistance value Rvs2 equated to the internal resistance of the electromotive force cell including a resistance component resulting from deterioration. The resistance value Rvs2 is affected by the temperature of the electromotive force cell, i.e., the resistance value Rvs2 is variable depending upon a variation of the electromotive force cell. For this reason, the deterioration detecting means detects the deteriorated condition of the wide range air-fuel ration sensor by comparison between the resistance value Rvs1 and the resistance value Rvs2.

According to the seventh aspect of the present invention, there is provided an apparatus for detecting a deteriorated condition of a wide range air-fuel ratio sensor, the air-fuel ratio sensor including two cells each having an oxygen ion conductive solid electrolytic body heated by a heater and two porous electrodes disposed on opposite sides of the oxygen ion conductive solid electrolytic body, respectively, the two cells being disposed so as to oppose each other with a gap therebetween, one of the cells being used as a pump cell for pumping oxygen out of or into the gap, the other of the cells being used as an electromotive force cell for generating a voltage according to a difference in oxygen concentration between an oxygen reference chamber and the gap, the apparatus comprising current applying means for applying a current to the electromotive force cell, voltage Vs0 detecting means for detecting a voltage Vs0 across the electrodes on opposite side surfaces of the electromotive force cell, suspending means for suspending the applying of the current to the electromotive force cell, voltage Vs2 detecting means for detecting a voltage Vs2 across the electrodes on the opposite side surfaces of the electromotive force cell after lapse of a time ranging from 10 ms to 50 ms after the applying of the current to the electromotive force cell is suspended, activity detecting means for detecting an activated condition of the wide range air-fuel ratio sensor based on the voltages Vs0 and Vs2, activating time interval detecting means for detecting an activating time interval between the time when it starts to energize the heater and the time when the wide range air-fuel ratio sensor becomes active, and deterioration detecting means for detecting a deteriorated condition of the wide range air-fuel ratio sensor based on the activating time interval.

By the seventh aspect, the current applying means applies a current to the electromotive force cell, and the voltage Vs0 detecting means detects the voltage Vs0 across the electrodes on the opposite side surfaces of the electromotive force cell. The suspending means suspends the application of the current to the electromotive force cell after lapse of a predetermined time after it starts to energize the heater. The voltage Vs2 detecting means detects the voltage Vs2 across the electrodes on the opposite side surfaces of the electromotive force cell after lapse of a time ranging from 10 ms to 50 ms after the application of the current is suspended. Thereafter, the activity detecting means detects the activated condition of the wide range air-fuel ratio sensor based on the voltages Vs0 and Vs2, while the activating time interval detecting means detects the activating time interval between the time when it starts to energize the heater and the time when the wide range air-fuel ratio sensor becomes active. In this connection, when the wide range air-fuel ratio sensor is deteriorated, it becomes higher the temperature at which the sensor becomes active. Namely, it becomes longer the heating time interval for heating the cell unit of the sensor till it is activated. For this reason, the deteriorated condition detecting means detects the deteriorated condition of the wide range air-fuel ratio sensor based on the activating time interval.

The above described method and apparatus are effective for solving the above noted problems inherent in the prior art method and apparatus.

It is accordingly an object of the present invention to provide a novel and improved method of detecting a deteriorated condition of a wide range air-fuel ratio sensor which can detect deterioration of the sensor accurately.

It is another object of the present invention to provide an apparatus for carrying out the above described method of the foregoing character.

DETAILED DESCRIPTION OF THE PREFERRED EMBODIMENTS

Figure 1:
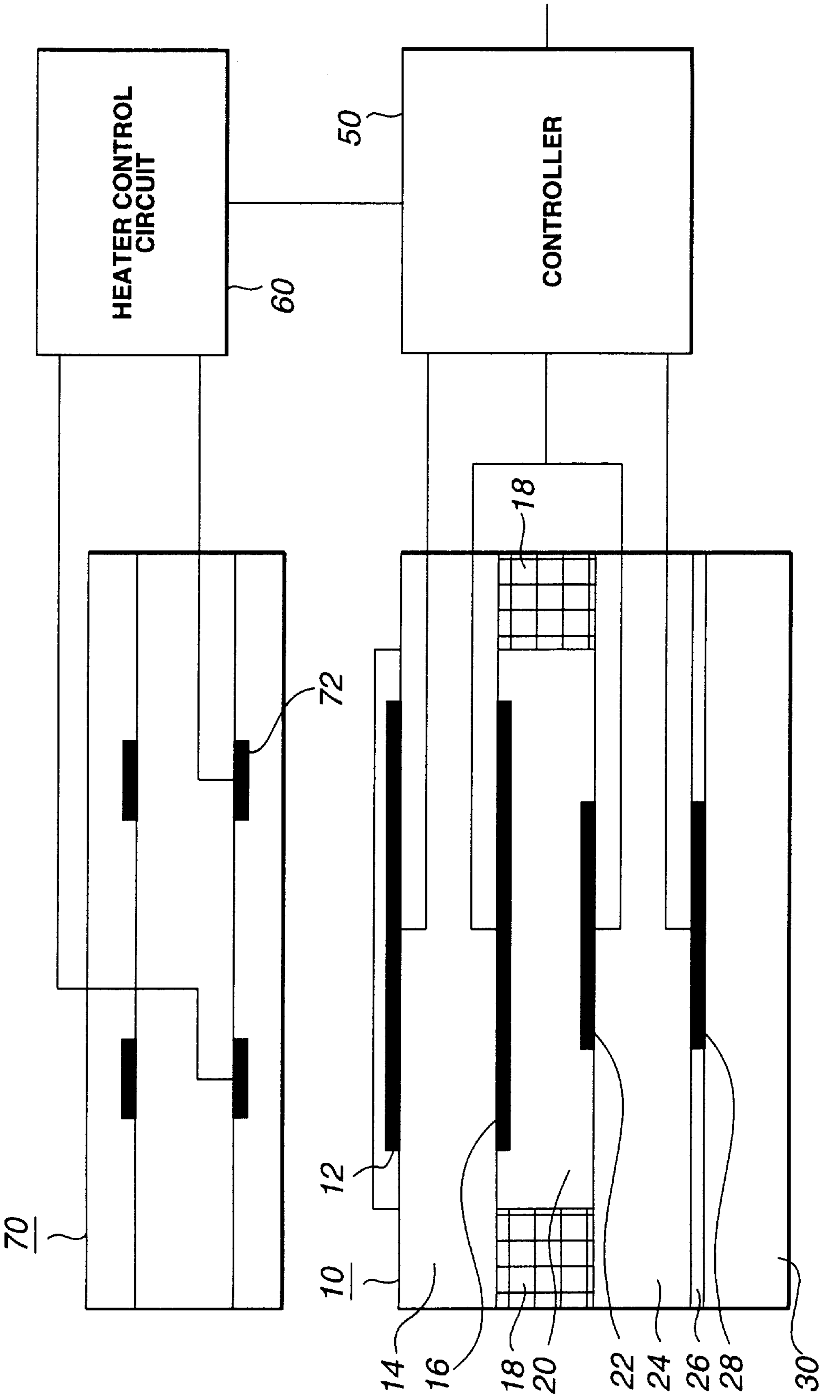
FIG. 1 is an illustration of a wide range air-fuel ratio sensor, heater control circuit and a controller according to an embodiment of the present invention.

Referring first to FIG. 1, a wide range air-fuel ratio sensor is shown as including a cell unit 10 and a heater 70. The cell unit 10 is disposed in an exhaust system (not shown) to measure the oxygen concentration in the exhaust gases. A controller 50 embodying the present invention is connected to the cell unit 10 for measuring the temperature of same. To the cell unit 10 is attached by way of an adhesive made of ceramic the heater 70 which is controlled by a heater control circuit 60. The heater 70 is made of an insulation material, i.e., a ceramic material such as alumina and has disposed therewithin a heater circuit or wiring 72. The heater control circuit 60 applies an electric power to the heater 70 in such a way as to maintain the resistance of the cell unit 10 to be measured by the controller 50 at a target value, whereby to maintain the temperature of the sensor unit 10 at a target value.

The cell unit 10 includes a pump cell 14, a porous diffusion layer 18, an electromotive force cell 24 and a reinforcement plate 30 which are placed one upon another. The pump cell 14 is made of solid electrolyte having an oxygen ion conductivity, i.e., stabilized or partially stabilized zirconia ($ZrO_2$) and has on the front and rear surfaces thereof porous electrodes 12 and 16 chiefly made of platinum, respectively. To the front surface side porous electrode 12 which is exposed to the measured gas is applied a voltage Ip+ for causing electric current Ip+ to flow therethrough, so that the front surface side porous electrode 12 is referred to as an Ip+ electrode. On the other hand, to the rear surface side porous electrode 14 is applied a voltage Ip− for causing electric current Ip− to flow therethrough, so that the rear surface side porous electrode 14 is referred to as an Ip− electrode.

The electromotive force cell 24 is similarly made of stabilized or partially stabilized zirconia ($ZrO_2$) and has on the front and rear surfaces thereof porous electrodes 22 and 28 chiefly made of platinum, respectively. Between the pump cell 14 and the electromotive force cell 24 is formed a gap (measuring chamber) 20 which is surrounded by the porous diffusion layer 18. Namely, the gap 20 is communicated with the measuring gas atmosphere by way of the porous diffusion layer 18. In the meantime, in this embodiment, the porous diffusion layer 18 is formed by filling a porous material in place but otherwise can be formed by disposing pores in place. At the porous electrode 22 disposed on the gap (measurement chamber) 20 side is generated a voltage Vs− by the electromotive force Vs of the electromotive force cell 24, so that the porous electrode 22 is referred to as a Vs− electrode. On the other hand, at the porous electrode 28 disposed on an oxygen reference chamber 26 side is generated a voltage Vs+ by the electromotive force Vs of the electromotive force cell 24, so that the porous electrode 28 is referred to as a Vs+ electrode. In the meantime, the reference oxygen within the reference oxygen chamber 26 is produced by pumping predetermined oxygen from the porous electrode 22 and into the porous electrode 28.

By this, a quantity of oxygen corresponding to the difference in oxygen concentration between the measured gas (i.e., the gas to be measured) and the atmosphere in the gap 20 is diffused into the gap 20 side by way of the porous diffusion layer 18. In this connection, when the air-fuel ratio of the atmosphere within the gap 20 is maintained at a theoretical value (i.e., stoichiometric), a potential of about 0.45 V is generated between the Vs+ electrode 28 and the Vs− electrode 22 of the electromotive force cell 24 due to the difference in oxygen concentration between the gap 20 and the oxygen reference chamber 26. For this reason, by controlling the current Ip flowing through the pump cell 14 in such a manner that the electromotive force Vs of the electromotive force cell 24 is regulated to 0.45 V and thereby holding the air-fuel ratio of the atmosphere in the gap 20 at a theoretical value (i.e., stoichiometric), the controller 50 measures the oxygen concentration in the measured gas on the basis of the pump cell current Ip for holding the air-fuel ratio of the atmosphere in the gap 20 at a theoretical value.

Figure 2:
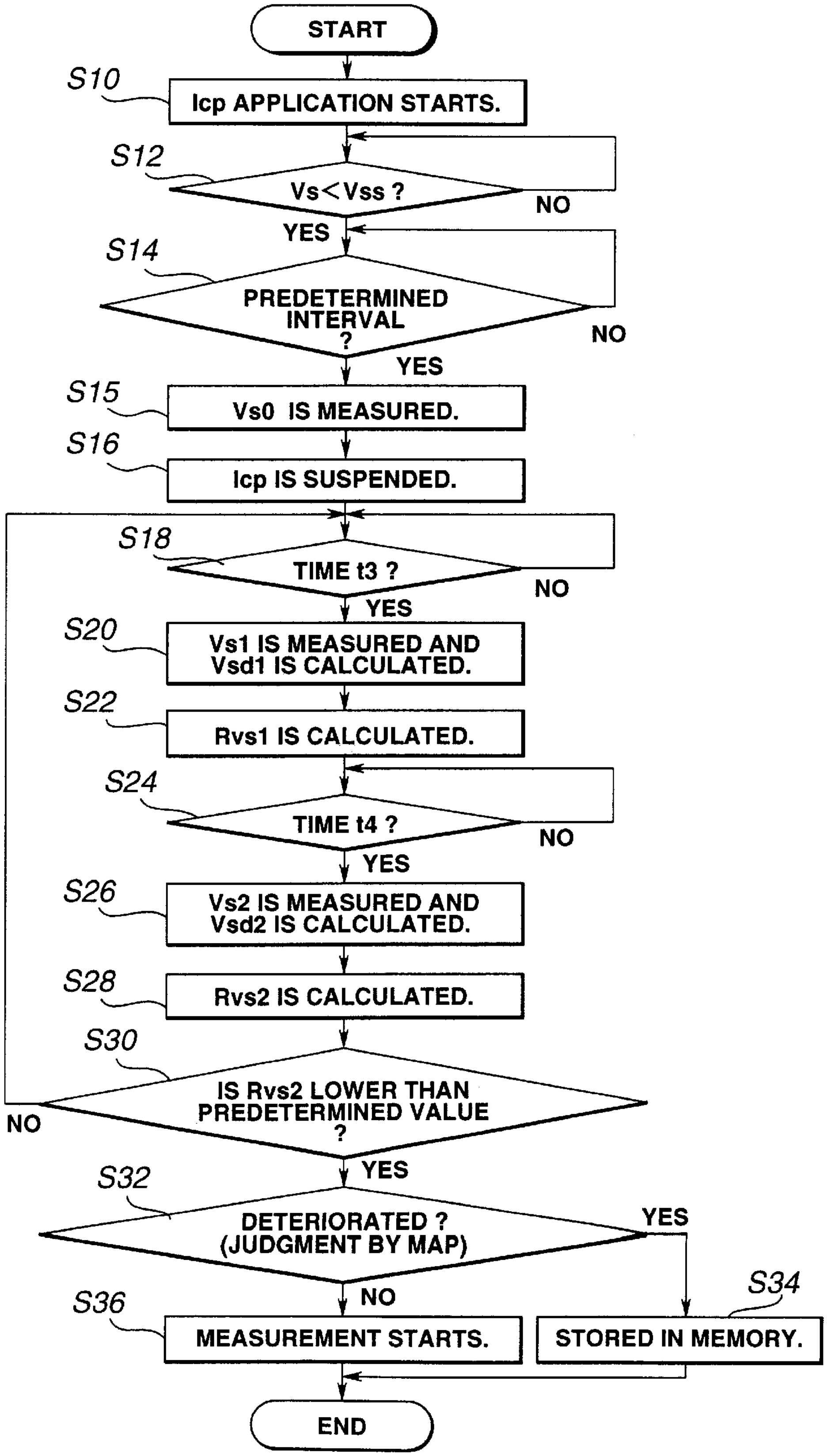
FIG. 2 is a flowchart of a control routine for a controller of FIG. 1.
Figure 3A:
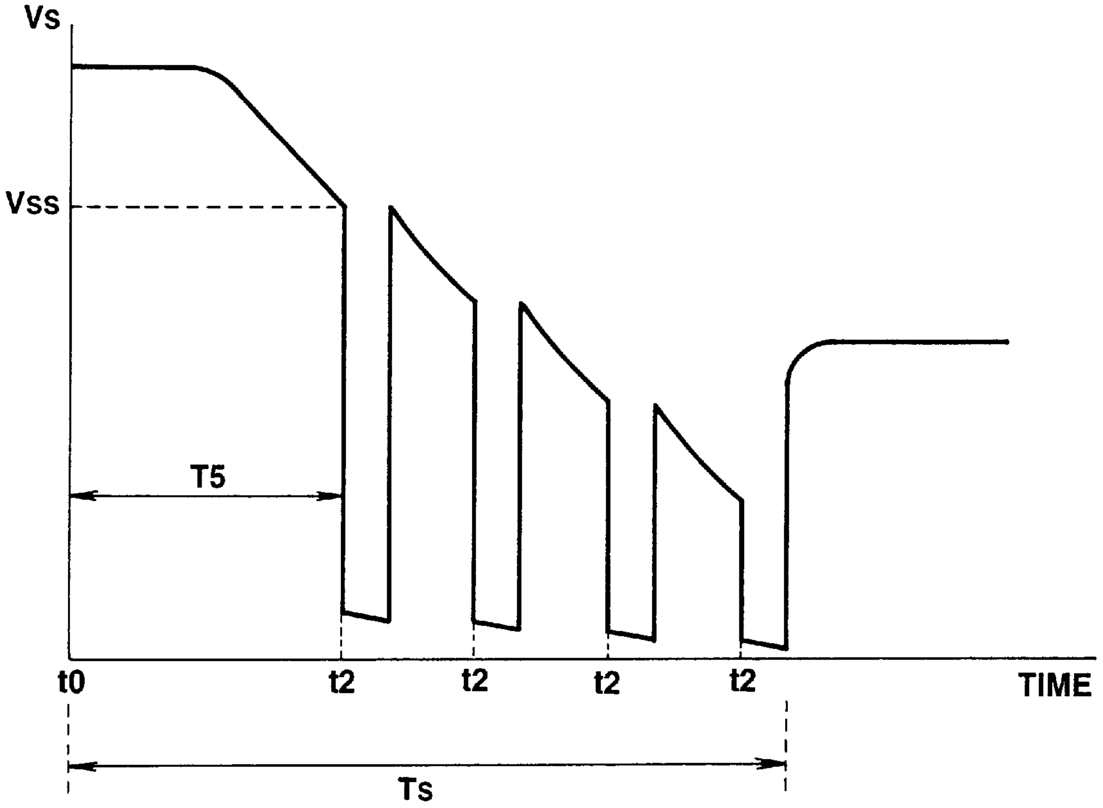
FIG. 3A is a graphic representation of a waveform of a voltage across an electromotive force cell of the sensor of FIG. 1.
Figure 3B:
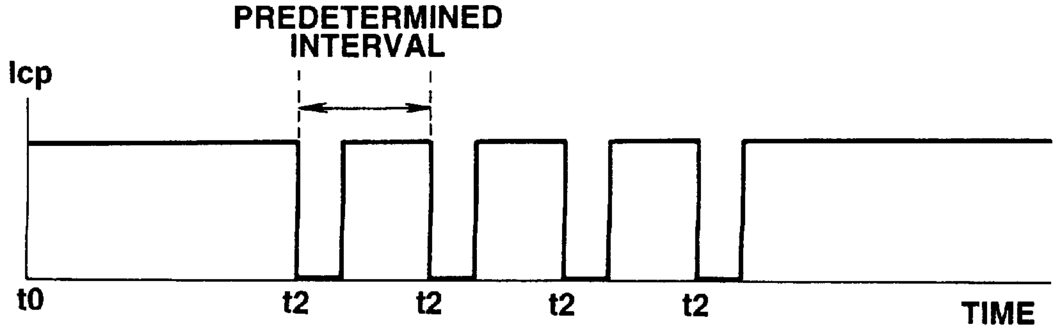
FIG. 3B is a graphic representation of a waveform of a current to be supplied to the electromotive force cell of the sensor of FIG. 1.
Figure 4:
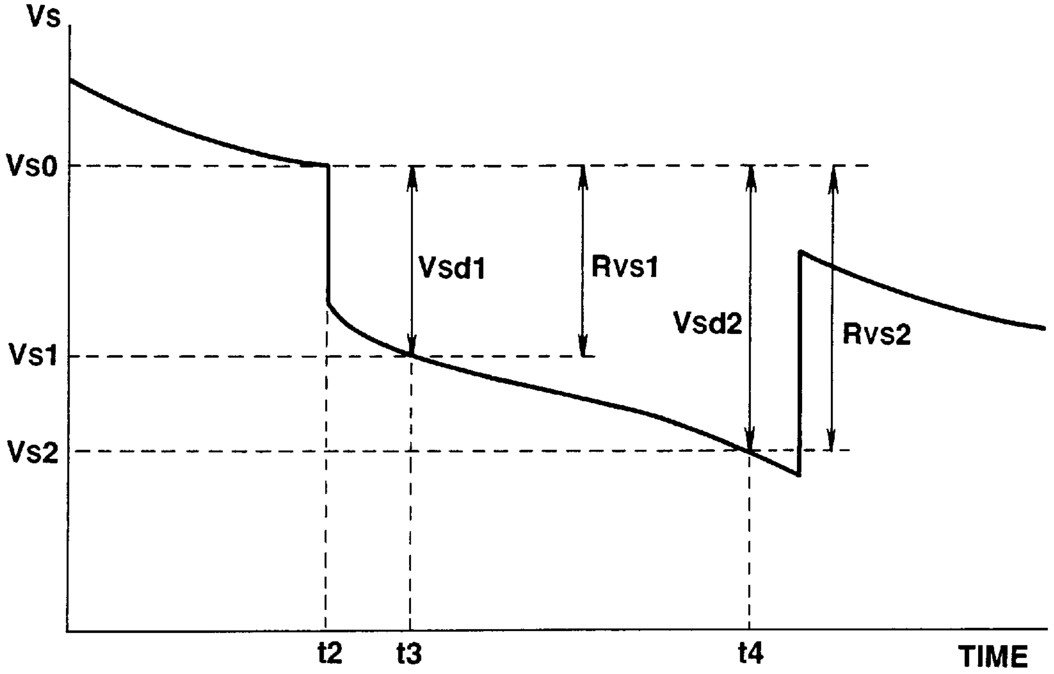
FIG. 4 is an enlarged, graphic representation of a portion of the waveform of FIG. 3A resulting when the current is shut off.

Referring to FIGS. 2 to 4, the operation of the controller 50 for detecting the activated condition of the wide range air-fuel ratio sensor will be described.

Firstly, after the engine has started, the controller 50 starts supplying a current to the heater 70 by way of the heater control circuit 60 while causing a constant current Icp to flow through the electromotive force cell 24 and measuring the voltage across the porous electrodes 22 and 28 at the opposite side surfaces of the electromotive force cell 24 (step S10). Then, judgment is made on whether the voltage Vs of the electromotive force cell 24 becomes equal to or lower than the voltage Vss (refer to FIG. 3A) at which there is caused a possibility that the cell unit 10 has been activated or has been brought into an activated condition (step S12). Namely, the controller 50 keeps supplying a current to the electromotive force cell 24 without any suspension or break until there is caused a possibility that the cell unit 10 has been brought into an activated condition.

When the voltage Vs of the electromotive force cell 24 becomes equal to or lower than the voltage Vss at which there is caused a possibility that the cell unit 10 has been brought into an activated condition (Yes in step S12), judgement is made on whether a predetermined interval has lapsed or not (step S14) and thereafter the voltage Vs0 is measured (S15). At the time t2 shown in FIGS. 3A and 3B, i.e., the time when a predetermined interval lapses (Yes in step S14), supply of the current Icp to the electromotive force cell 24 is interrupted or suspended (step S16). The waveform of voltage of FIG. 3A is shown in an enlarged scale in FIG. 4.

At the time t3 immediately after the interruption of the current, i.e., after lapse of time ranging from 10 μm to 1 ms after interruption of the current (Yes in S18), the controller 50 measures the voltage Vs1 across the electromotive force cell 24 at the time t3 and calculates the difference between the voltage Vs0 of the electromotive force cell 24 immediately before the interruption of the current and the voltage Vs1 of same at the time t3, i.e., the voltage drop Vsd1 (step S20). Then, the internal resistance Rvs1 of the electromotive force cell 24 is calculated and thereafter a map having been prepared beforehand is searched for the temperature of the cell unit 10 (step S22). Thereafter, at the time t4 when the time ranging from 10 to 50 ms elapses after the time t2 at which supply of the current Icp is interrupted becomes (Yes in step S24), it is made to measure the voltage Vs2 across the electromotive force cell 24 at the time t4 and calculate the difference between the voltage Vs0 of the electromotive force cell 24 immediately before the interruption of the current and the voltage Vs2 of same at the time t4, i.e., the voltage drop Vsd2 (step S26). Thereafter, the internal resistance Rvs2 of the electromotive force cell 24, including a resistance component resulting from deterioration, is calculated or a map having been prepared beforehand is searched for such an internal resistance Rvs2 (step S28).

Referring to FIG. 4, description will now be made as to the voltage Vs of the electromotive force cell 24 at the time of interruption of supply of the current Icp. Firstly, the voltage Vs of the electromotive force cell 24 is expressed by:

$$Vs = Icp \times Rvs + EMF$$

where Rvs is the internal resistance of the electromotive force cell 24 and EMF is the internal electromotive force of the electromotive force cell 24.

When supply of the current Icp is interrupted or suspended, the voltage Vs of the electromotive force cell 24 drops rapidly to become equal to the internal electromotive force EMF. In this instance, since the current Icp is a known value, the internal resistance Rvs1 can be obtained by measuring the voltage drop Vsd1 as described above and dividing the current Icp by the measured voltage drop Vsd1 (steps S20 and S22). In the meantime, the voltage drop Vsd1 immediately after the interruption of the supply of the current Icp depends on only the temperature of the electromotive force cell 24 and is not directly affected by the deterioration of the electromotive force cell 24 as will be described hereinafter.

The voltage Vs of the electromotive force cell 24 drops rapidly first as described above and then gradually. The gradual drop of the voltage Vs depends mainly on the deterioration of the electromotive force cell 24, i.e., of the cell unit 10. The electromotive force cell 24 of the cell unit 10 is comprised of the porous electrodes 22 and 28 made of Pt (platinum) attached to the front and rear surfaces of the partly stabilized zirconia plate as described above, so after an elongated period of usage there occurs separation between the partly stabilized zirconia plate and the porous electrodes 22 and 28 while at the same time the oxygen permeability of the porous electrodes 22 and 28 drops, thus increasing the internal resistance. However, in the wide range air-fuel ratio sensor made of partly stabilized zirconia, the internal resistance resulting from such deterioration does not appear immediately after the above described interruption of the supply of the current, so that in this embodiment measurement of the voltage drop Vsd1 is made at the time t4, i.e., the time when the time ranging from 10 to 50 ms lapses after the time t2 at which supply of the current Icp is interrupted, and the voltage drop Vsd2 including a resistance component resulting from deterioration is calculated.

In the next step (step S30), judgement on whether the internal resistance Rvs2 is equal to or lower than a predetermined value is made. In case the internal resistance Rvs2 is equal to or lower than a predetermined value, it is judged that the cell unit 10 has not yet been activated and the process routine for judgement of activation is repeated again.

Figure 7:
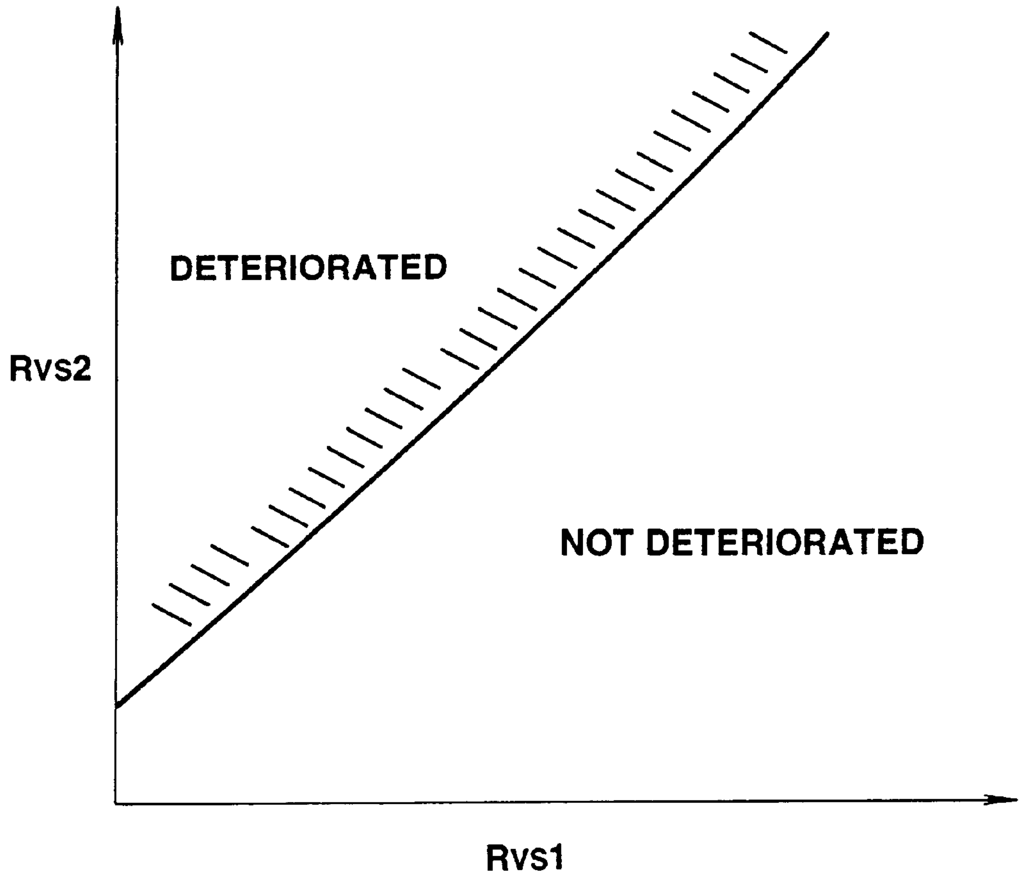
FIG. 7 is a graphic representation of a map for use in the step S32 in the flowchart of FIG. 2.

In case it is judged that the cell unit 10 has been activated, a search for judgment on the deterioration of the cell unit 10 is made by using a map installed in the controller 50 beforehand and the internal resistance values Rvs1 and Rvs2 which have been obtained in the above described steps (step S32). An example of such a map is shown in FIG. 7.

On the other hand, judgment on the deterioration can be made by calculation using Rvs2 and Rvs1. In case of a simple model, the difference between Rvs2 and Rvs1 can be considered as representing a resistance component at the interface between the porous electrode and the electrolytic body. Although it is judged that the cell unit 10 has been deteriorated when the resistance component is larger than a certain value, the resistance component at that interface is variable basically depending upon the temperature. Thus, the resistance component at the interface is first compensated for a temperature variation by using the following expression and then based on whether the resistance component thus compensated for is equal to or larger than a predetermined resistance value Rr judgement on the deterioration is made.

$$(Rvs2 - Rvs1)/Rvs1$$

When by the map or by calculation it is judged that the cell unit 10 has been deteriorated, the result is stored in the memory and it is made not to start an air-fuel ratio detecting operation of the wide range air-fuel ratio sensor (step S34).

On the other hand, in case it is judged that the cell unit 10 has not been deteriorated, measurement of the oxygen concentration is made to start (step S36) and the program for detection of deterioration is ended.

By the above described first embodiment, it becomes possible to detect the activity of the wide range air-fuel ratio sensor and in addition it becomes possible to detect the aged deterioration of the electromotive force cell 24 accurately.

Figure 5:
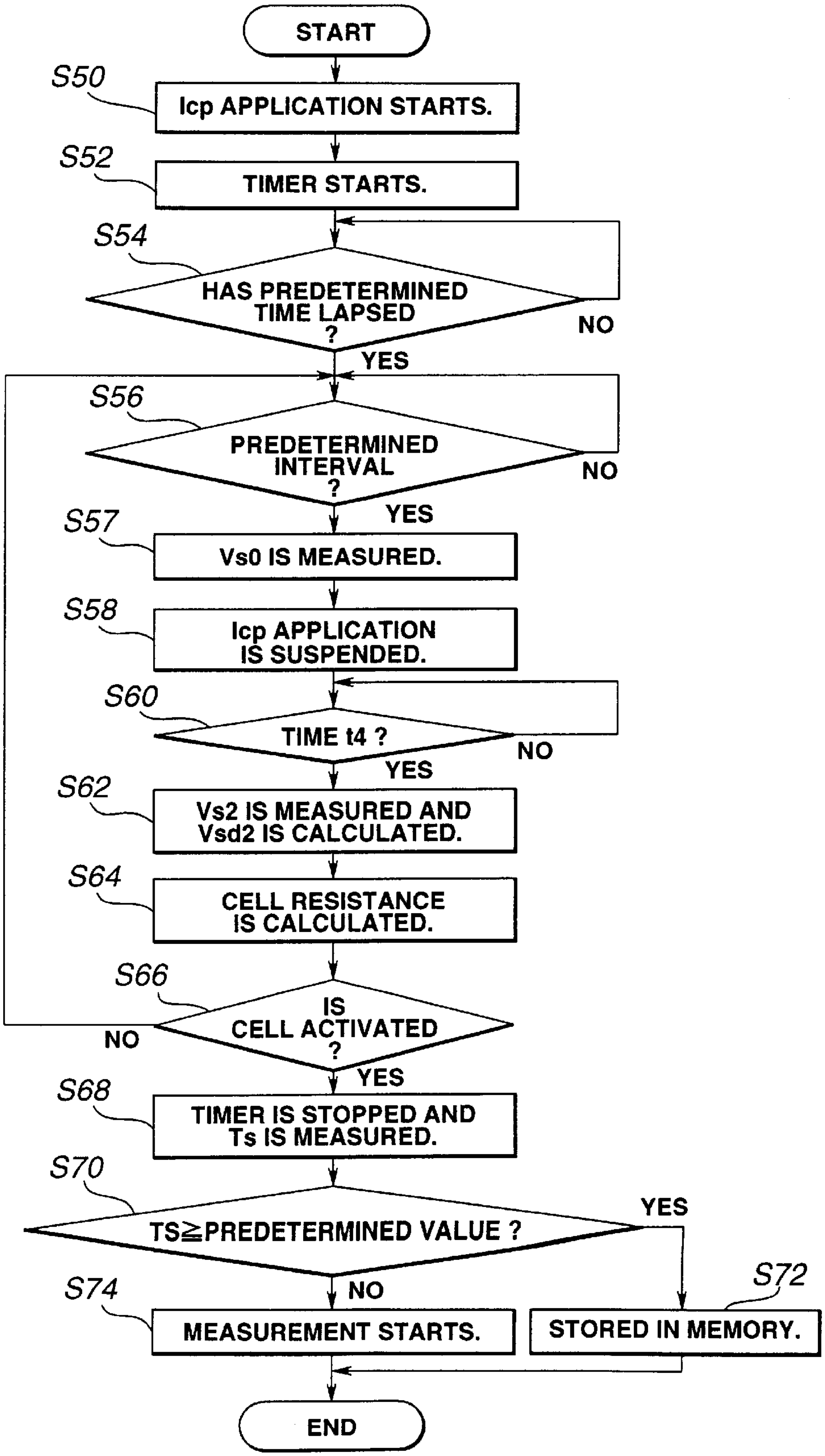
FIG. 5 is a flowchart of a control routine for the controller of FIG. 1, according to another embodiment of the present invention.

Referring to FIG. 5, description will be made as to an activity and deterioration detecting operation of a controller of a wide range air-fuel ratio sensor according to a second embodiment. This embodiment is substantially the same in the structure and the method of interrupting the current with the first embodiment described with reference to FIGS. 1 to 3, so this embodiment will be described with additional reference to FIGS. 1 to 3 and repeated description is omitted for brevity.

Figure 6:
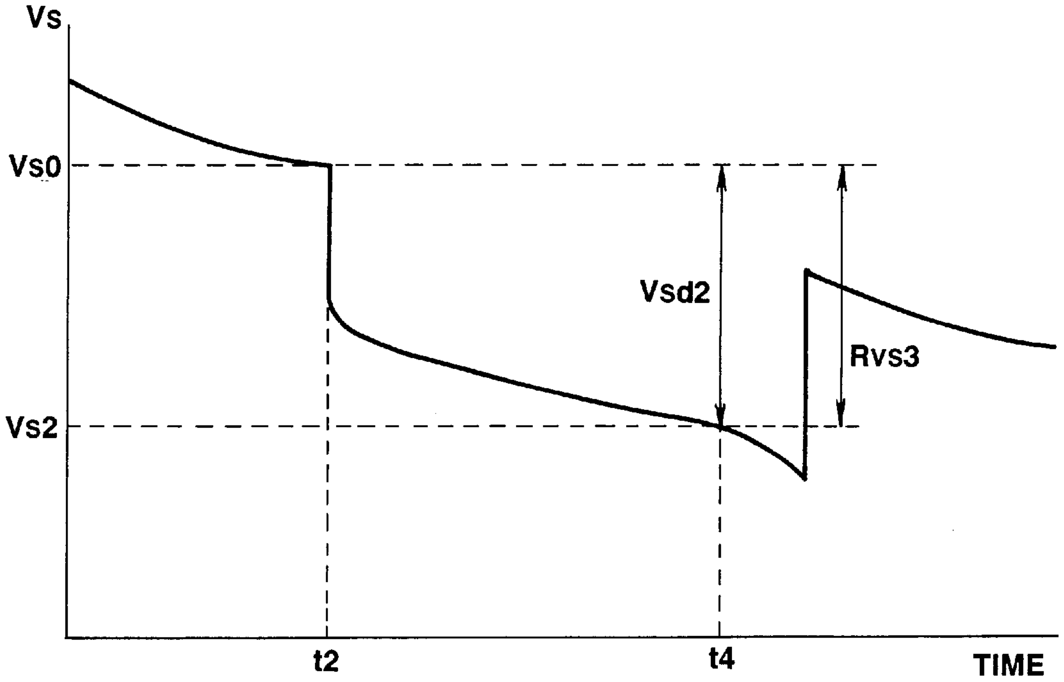
FIG. 6 is an enlarged, graphic representation of a portion of the waveform of FIG. 3A resulting when supply of the current is interrupted.

In the second embodiment, the controller 50, after the engine has started, supplies a current to the heater 70 by way of the heater control circuit 60 to heat the cell unit 10 and activate it. Then, the controller 50 supplies current Icp to the electromotive force cell 24 to detect, depending upon the voltage Vs of the electromotive force cell 24, whether the electromotive force cell 24 becomes heated and activated, and then starts measurement of the oxygen concentration while making judgment on the deterioration of the electromotive force cell 24. Such an operation of the controller 50 will be described more in detail with reference to the flowchart of FIG. 5 together with FIG. 3A showing the voltage Vs of the electromotive force cell 24, FIG. 3B showing the current Icp of the electromotive force cell 24 and FIG. 6 showing, in an enlarged scale, the waveform resulting when supply of the current Icp is interrupted.

Firstly, after the engine has started, the controller 50 supplies current to the heater 70 by way of the heater control circuit 60. Simultaneously with this, the controller 50 supplies a constant current Icp to the electromotive force cell 24 and measure the voltage across the porous electrodes 22 and 28 disposed on the opposite side surfaces of the electromotive force cell 24 (step S50). After it is made to start a timer for measuring a time interval necessary for the electromotive force cell 24 to become active, judgment on whether it has elapsed the time interval during which there is caused a possibility that the cell unit 10 has been activated, i.e., whether it has elapsed the time interval T5 which is the shortest time interval for the cell unit 10 to be activated (refer to FIG. 3A) (step S52). Supply of current to the electromotive force cell 24 is continued without any interruption or suspension until there is caused a possibility that the cell unit 10 has been activated.

When it has elapsed the time at which there is caused the above described possibility of activation (Yes in step S54), judgment on whether a predetermined time interval has elapsed is made (step S56), and at the time t2 when a predetermined interval elapses as shown in FIGS. 3A and 3B (Yes in step S56) the voltage Vs0 across the electromotive force cell 24 is measured) (S57) and thereafter supply of the current Icp to the electromotive force cell 24 is interrupted or suspended (S58). FIG. 3A shows the waveform representative of a variation of voltage resulting at the time when supply of current is suspended.

At the time t4, i.e., at the time when the time ranging from 10 to 50 ms lapses after the supply of the current is interrupted (Yes in step S60), it is made to measure the voltage Vs2 across the electromotive force cell 24 at the time t4 and calculate the difference between the voltage Vs0 immediately before the supply of the current to the electromotive force cell 24 is interrupted and the voltage Vs2 at the time t4, i.e., the voltage drop Vsd2 (step S62). Then, the internal resistance of the electromotive force cell 24 (i.e., the resistance Rvs3 including a resistance component resulting from deterioration) is calculated or a map having been prepared beforehand is searched for that internal resistance (step S64). Thereafter, judgment on the activity of the cell unit 10 is made base on whether the calculated or searched internal resistance Rvs3 of the electromotive force cell 24 has become a predetermined value or not (step S66).

In this instance, in case the cell unit 10 has not yet been activated (No in step S66), heating is continued further, and the control is returned back to the step S56 to judge whether the above described interval has elapsed. When that interval has elapsed (Yes in step S56), the supply of the current Icp is interrupted (step S58) to end the above described process.

On the other hand, in case it is judged in step S66 that the electromotive force cell 24 has been heated up to the active temperature (Yes in step S66), the timer for measuring the time interval necessary for the electromotive force cell 24 to be activated is stopped and it is measured the time interval Ts between the time when it starts to supply the current Icp, i.e., it starts to heat the wide range air-fuel ratio sensor by the heater 70 and the time when the wide range air-fuel ratio sensor is activated (S68). Then, it is judged whether the time interval Ts exceeds the longest time interval for activation of the electromotive force cell 24 (step S70). Namely, as the electromotive force cell 24 deteriorated, it becomes higher the temperature at which the electromotive force cell 24 is activated or becomes active and it becomes longer the time interval for heating the electromotive force cell 24 till it is activated. For this reason, in the second embodiment, the longest time interval which is supposed to be necessary for activation of a cell unit not yet deteriorated is determined previously as the longest heating time interval, and judgment on the deterioration of the cell unit is made based on whether the time interval Ts exceeds that longest heating time interval.

In this instance, in case the time interval Ts does not exceed the predetermined longest heating time interval (No in step S70), it starts to supply a current to the pump cell 14 and measure the oxygen concentration in the exhaust gases by means of the wide range air-fuel ratio sensor (step S74). On the other hand, in case the time interval Ts exceeds the predetermined longest heating time interval (Yes in step S70), an information as to the deterioration of the wide range air-fuel ratio is stored in the memory provided to an engine control unit or the like for storing the information concerning various conditions of a vehicle and thenceforce it is made not to start detection of the oxygen concentration by the wide range air-fuel ratio sensor. On the basis of the information stored in the memory, the wide range air-fuel ratio sensor is replaced by new one at the time of a periodical inspection or the like, so that thenceforth the air-fuel ratio control of the engine can be done suitably.

By the second embodiment, it becomes possible to detect whether the wide range air-fuel ratio is activated and in addition it becomes possible to determine aged deterioration of the electromotive force cell 24 accurately.

Figure 8:
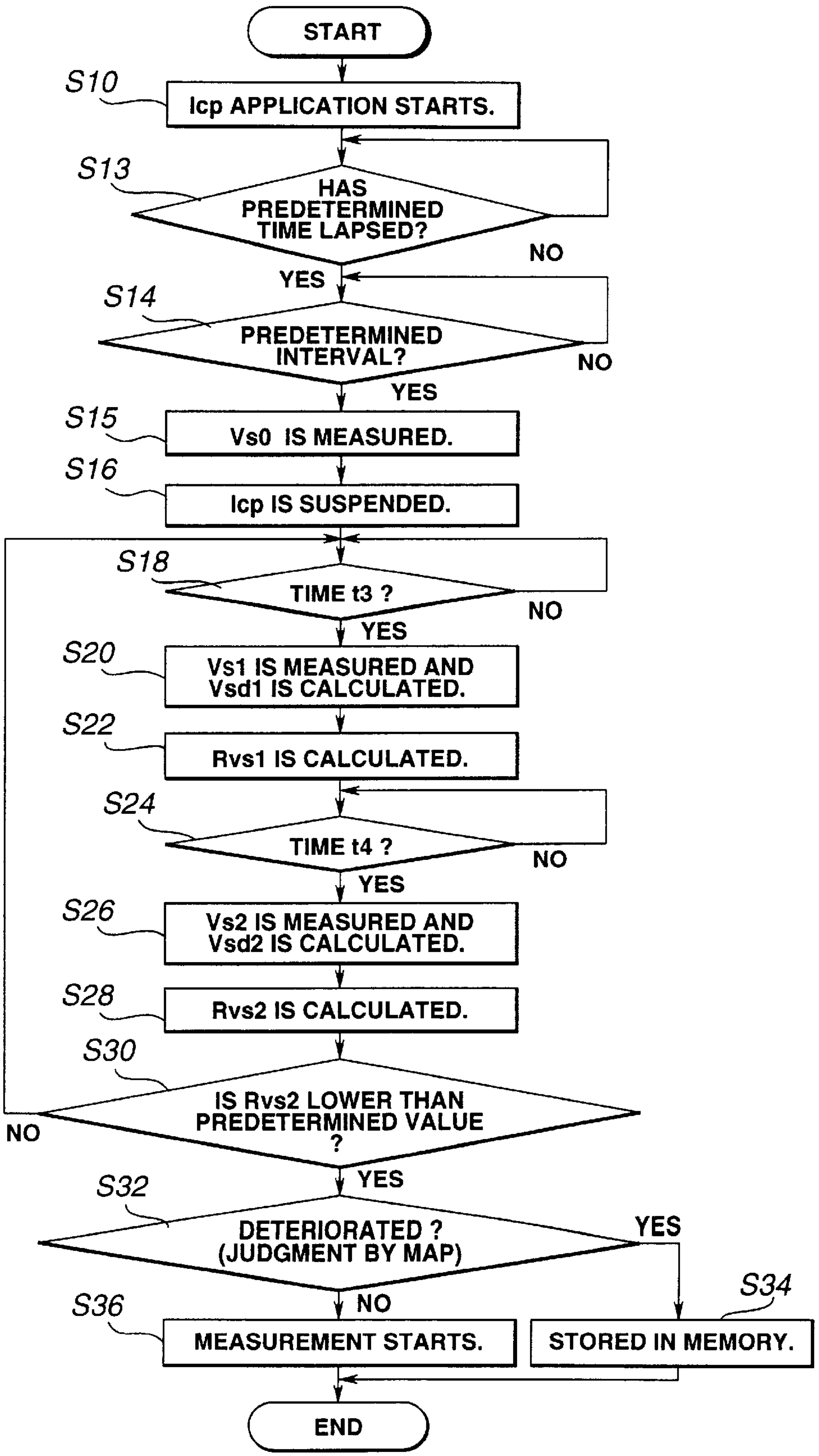
FIG. 8 is a variation of the flowchart of FIG. 2.
Figure 9:
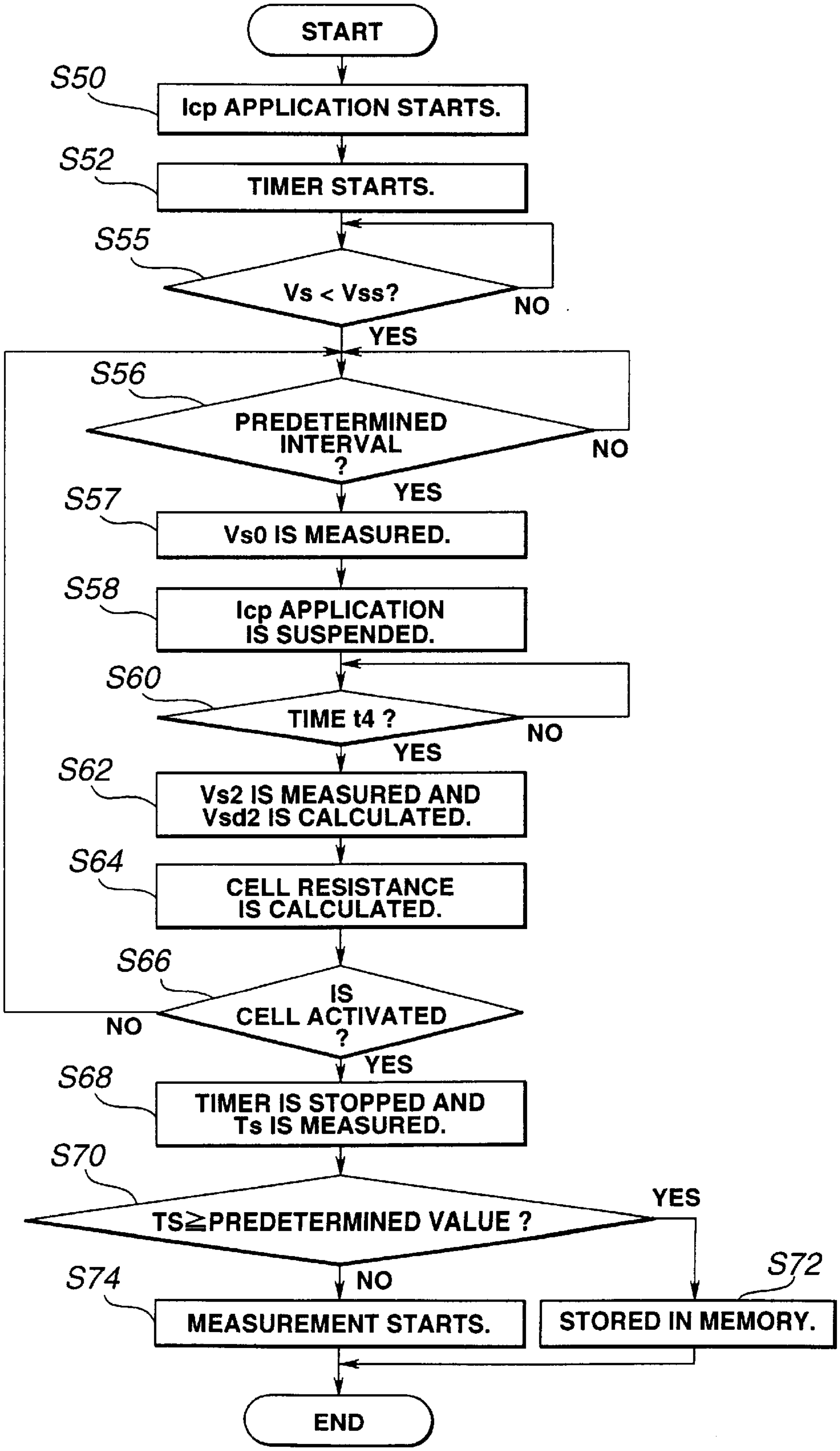
FIG. 9 is a variation of the flowchart of FIG. 5.

In the meantime, in the first embodiment described with respect to FIGS. 1 to 3, interruption of the supply of the current for detection of the activity is made to start after it is judged in step S12 in FIG. 2 whether the voltage Vs of the electromotive force cell 24 becomes equal to or lower than a predetermined value. In the second embodiment described with respect to FIG. 5, interruption of the supply of current for detection of the activity is made to start after it is judged in step S54 in FIG. 5 whether a predetermined time has lapsed. However, the method of starting interruption of the supply of the current for detection of the activity when it is judged that a predetermined time has lapsed (S54) in the second embodiment, can be applied to the control of the first embodiment by making such a judgement as shown in FIG. 8 which shows a variant of the control routine of FIG. 2, i.e., in steps S13 in the control routine of FIG. 8. Similarly, the method of starting interruption of the supply of the current for detection of the activity when it is judged that the voltage becomes equal to or lower than a predetermined value (S12) in the first embodiment, can be applied to the control of the second embodiment by making such a judgment as shown in FIG. 9 which shows a variant of the control routine of FIG. 5, i.e., in the step S55 in the control routine of FIG. 9.

Further, while in the first and second embodiments constant-current is supplied to the electromotive force cell 24, constant voltage can be applied in place of constant-current and application of the constant-voltage can be interrupted with predetermined intervals. Further, while in the above described embodiments deterioration of the wide range air-fuel ratio sensor is detected at the time of warming up of an engine, the deterioration can be detected similarly even at the time of normal operation of the engine by interrupting supply of the current to the electromotive force cell.

What is claimed is:

1. A method of detecting a deteriorated condition of a wide range air-fuel ratio sensor, wherein the air-fuel ratio sensor includes two cells each having an oxygen ion conductive solid electrolytic body heated by a heater and two porous electrodes disposed on opposite sides of the oxygen ion conductive solid electrolytic body, respectively, the two cells being disposed so as to oppose each other with a gap therebetween, one of the cells being used as a pump cell for pumping oxygen out of or into the gap, and the other cell of the cells being used as an electromotive force cell for generating a voltage according to a difference in oxygen concentration between an oxygen reference chamber and the gap, the method comprising:

a first step of applying a current to the electromotive force cell;

a second step of detecting a voltage Vs0 across the electrodes on opposite side surfaces of the electromotive force cell;

a third step of suspending said applying of the current to the electromotive force cell;

a fourth step of detecting a voltage Vs1 across the electrodes on the opposite side surfaces of the electromotive force cell after a lapse of a time ranging from 10 μs to 1 ms after said third step;

a fifth step of detecting a voltage Vs2 across the electrodes on the opposite sides of the electromotive force cell after a lapse of a time ranging from 10 ms to 50 ms after said third step; and a sixth step of detecting the deteriorated condition of the wide range air-fuel ratio sensor based on said voltages Vs0, Vs1, and Vs2;

wherein said third step is executed after a lapse of a predetermined time from the start of energizing of the heater for allowing said voltage Vs0 detected at said second step to become equal to or lower than a predetermined value.

2. A method of detecting a deteriorated condition of a wide range air-fuel ratio sensor, wherein the air-fuel ratio sensor includes two cells each having an oxygen ion conductive solid electrolytic body heated by a heater and two porous electrodes disposed on opposite sides of the oxygen ion conductive solid electrolytic body, respectively, the two cells being disposed so as to oppose each other with a gap therebetween, one of the cells being used as a pump cell for pumping oxygen out of or into the gap, and the other of the cells being used as an electromotive force cell for generating a voltage according to a difference in oxygen concentration between an oxygen reference chamber and the gap, the method comprising:

a first step of applying a current to the electromotive force cell;

a second step of detecting a voltage Vs0 across the electrodes on opposite side surfaces of the electromotive force cell;

a third step of suspending said applying of the current to the electromotive force cell;

a fourth step of detecting a voltage Vs1 across the electrodes on the opposite side surfaces of the electromotive force cell after a lapse of a time ranging from 10 μs to 1 ms after said third step;

a fifth step of detecting a voltage Vs2 across the electrodes on the opposite side surfaces of the electromotive force cell after a lapse of a time ranging from 10 ms to 50 ms after said third step;

a sixth step of detecting a first resistance value Rvs1 of the electromotive force cell based on said voltages Vs0 and Vs1;

a seventh step of detecting a second resistance value Rvs2 of the electromotive force cell based on said voltages Vs0 and Vs2; and an eighth step of detecting the deteriorated condition of the wide range air-fuel into sensor by comparison of said resistance values Rvs1 and Rvs2;

wherein said third step is executed after a lapse of a predetermined time from the start of energizing of the heater for allowing said voltage Vs0 detected at said second step to become equal to or lower than a predetermined value.

3. An apparatus for detecting an activated condition of a wide range air-fuel ratio sensor, the air-fuel ratio sensor including two cells each having an oxygen ion conductive solid electrolytic body heated by a heater and two porous electrodes disposed on opposite sides of the oxygen ion conductive solid electrolytic body, respectively, the two cells being disposed so as to oppose each other with a gap therebetween, one of the cells being used as a pump cell for pumping oxygen out of or into the gap, the other of the cells being used as an electromotive force cell for generating a voltage according to a difference in oxygen concentration between an oxygen reference chamber and the gap, the apparatus comprising:

current applying means for applying a current to the electromotive force cell;

voltage detecting means for detecting a voltage Vs0 across the electrodes on opposite side surfaces of the electromotive force cell;

suspending means for suspending said applying of the current to the electromotive force cell;

voltage detecting means for detecting a voltage Vs1 across the electrodes on the opposite side surfaces of the electromotive force cell after a lapse of a time ranging from 10 ms to 1 ms after said applying of the current to the electromotive force cell is suspended;

voltage detecting means for detecting a voltage Vs2 across the electrodes on the opposite side surfaces of the electromotive force cell after a lapse of a time ranging from 10 ms to 50 ms after said applying of the current to the electromotive force cell is suspended;

detecting means for detecting a first resistance value of Rvs1 of the electromotive force cell based on the voltages Vs0 and Vs1;

detecting means for detecting a second resistance value Rvs2 of the electromotive force cell based on the voltages Vs0 and Vs2; and deterioration detecting means for detecting the deteriorated condition of the wide range air-fuel ratio sensor based on the resistance values Rvs1 and Rvs2.

* * * * *